United States Patent [19]
Jurisch et al.

[11] Patent Number: 4,972,286
[45] Date of Patent: Nov. 20, 1990

[54] GROUNDING POLE STRUCTURES IN THIN FILM MGANETIC HEADS

[75] Inventors: Mark Jurisch, Prior Lake; Scott D. Dobbins, Edina, both of Minn.

[73] Assignee: Seagate Technology, Inc., Scotts Valley, Calif.

[21] Appl. No.: 319,144

[22] Filed: Mar. 3, 1989

[51] Int. Cl.$^5$ .............................................. G11B 5/147
[52] U.S. Cl. ..................... 360/126; 360/110; 360/122
[58] Field of Search ............... 360/126, 125, 127, 122, 360/110; 29/603

[56] References Cited

U.S. PATENT DOCUMENTS

| | | | |
|---|---|---|---|
| 3,079,467 | 2/1963 | Rettinger | 360/120 |
| 3,860,965 | 1/1975 | Voegeli | 360/113 |
| 4,012,781 | 3/1977 | Lin | 360/113 |
| 4,317,149 | 11/1982 | Elser et al. | 360/126 |
| 4,343,026 | 8/1982 | Griffith et al. | 360/113 |
| 4,356,523 | 10/1982 | Yeh | 360/113 |
| 4,404,113 | 8/1977 | Gorter | 360/113 |
| 4,546,541 | 10/1985 | Reid | 360/127 X |
| 4,660,113 | 4/1987 | Nomura et al. | 360/113 |
| 4,800,454 | 1/1989 | Schwarz et al. | 360/103 |
| 4,809,103 | 2/1989 | Lazzari | 360/126 X |
| 4,841,395 | 6/1989 | Craft | 360/126 X |

FOREIGN PATENT DOCUMENTS 0022815 2/1979 Japan .
0103512 7/1985 Japan .

OTHER PUBLICATIONS

IBM/TDB, vol. 18, No. 1, Jun. 1975, pp. 27–28, "High-Density Head" by Kehr et al.

*Primary Examiner*—John H. Wolff
*Attorney, Agent, or Firm*—Kinney & Lange

[57] ABSTRACT

A thin film magnetic read/write head is electrically grounded. The pole pieces or core of the thin film head is electrically connected to the base substrate of the thin film head. Electrical connection is through a conductive stud extending through a base coat layer and sandwiched between the core and the base substrate of the thin film magnetic read/write head.

9 Claims, 9 Drawing Sheets

GROUNDING POLE STRUCTURES IN THIN FILM MGANETIC HEADS

BACKGROUND OF THE INVENTION

1. Field of the Invention

The present invention relates to thin film magnetic read/write heads. In particular, the invention relates to a method for electrically grounding the pole pieces or core material used in thin film magnetic heads.

2. Description of the Prior Art

As computer systems have multiplied and the demand for high density storage media has increased, magnetic recording heads have developed to meet the demand for increased storage density. One method of increasing magnetic recording densities is through the use of magnetic read/write heads having a highly intense and highly concentrated fringe field. The fringe field is the magnetic field that extends or "fringes" beyond the gap formed between the two poles of the magnetic head. This improved fringe field has been achieved by decreasing the size of magnetic read/write heads, particularly the gap between the two magnetic poles of the read/write head.

The dimensions of magnetic heads have steadily shrunk, employing new technologies to achieve increasingly smaller sizes. One method of fabricating extremely small magnetic recording heads is through the use of thin film technology. Using this method of manufacture, the magnetic recording head is fabricated in much the same manner as semiconductor integrated circuits are manufactured. Through a series of steps involving masking and selectively depositing materials upon a wafer, microscopic thin film magnetic read/write heads may be manufactured.

Such small thin film magnetic heads, however, suffer from a number of problems. The heads have a high degree of sensitivity to noise signals. Furthermore, stray capacitance due to the separation between the thin film magnetic head and surrounding materials tends to limit the performance of magnetic storage systems using thin film heads. Particularly during the read operation, the performance of a thin film magnetic head could be improved by eliminating stray capacitance and lowering the head's sensitivity to noise signals from the surrounding environment.

SUMMARY OF THE INVENTION

In the present invention, the above-described problems due to stray capacitance and noise sensitivity are reduced by electrically grounding the pole pieces or core material in the thin film magnetic head. An electrically conductive stud is included in the magnetic head which electrically connects the magnetic core to the base or flyer substrate material upon which the thin film head is fabricated. First, the conductive stud is deposited upon the base or flyer material. Next, a base coat is deposited across the entire wafer covering both the stud and the exposed portions of the base or flyer substrate. The substrate surface is then lapped down until the base coat material is removed from the conductive stud and the stud face is exposed. Core material is then deposited upon the base coat and stud. This deposition process causes the core material to be in electrical contact with the conductive stud such that there is an electrical circuit between the core of the thin film magnetic head and the substrate.

The electrical circuit between the core and substrate through the stud electrically shorts out the stray capacitance between the core material and the base substrate. Furthermore, by electrically grounding the magnetic core, the thin film magnetic head is less susceptible to noise signals present in its operating environment.

DETAILED DESCRIPTION OF THE PREFERRED EMBODIMENT

Figure 1:
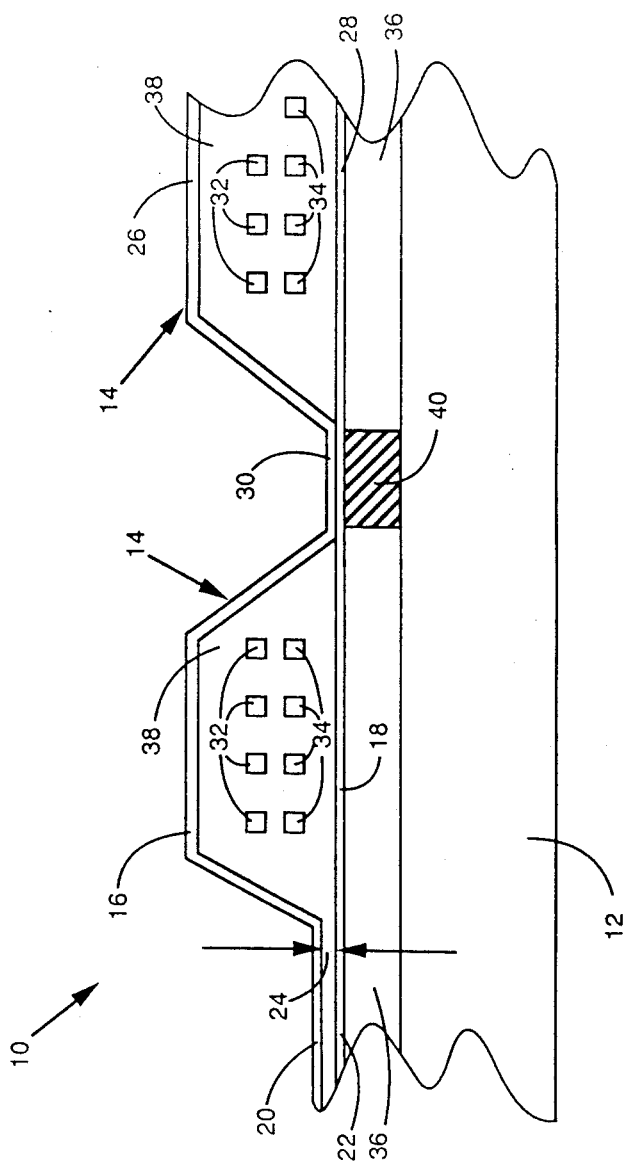
FIG. 1 is a cross sectional view of a portion of the thin film magnetic read/write recording head of the present invention.
Figure 2:
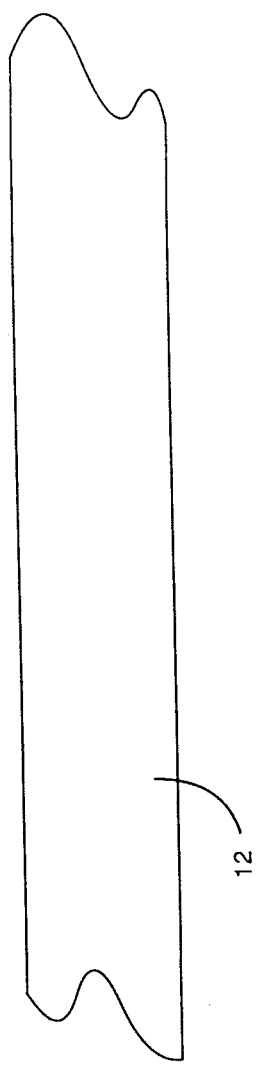
FIG. 2 is a cross sectional view of a portion of the substrate material of FIG. 1.

FIG. 1 shows a cross sectional view of a thin film magnetic head 10. Thin film head 10 includes base or "flyer" substrate 12 and pole pieces or core 14. Flyer substrate 12 may comprise, for example, ALSIMAG material. Typically, core 14 is formed using thin film layers of magnetic material, such as Permalloy. Core 14 comprises front upper portion 16 and front lower portion 18. Front upper and lower portions 16 and 18 form upper pole tip 20 and lower pole tip 22 between which gap 24 is formed. Core 14 also includes rear upper portion 26 and rear lower portion 28. Front upper and lower portions 16 and 18 and rear upper and lower portions 26 and 28 of core 14 meet at center area or via 30.

Thin film head 10 of FIG. 1 uses two core windings formed by conductors 32 and 34. Conductors 32 and 34 are formed in a coil around the center or via 30 of core 14 with a portion of the wrapping being sandwiched between front upper and lower portions 16 and 18 of core 14 and a portion of the wrapping sandwiched between rear upper and lower portions 26 and 28 of core 14. Core 14 is separated from substrate 12 by base coat 36. Typically, base coat 36 is an insulator such as $Al_2O_3$. The area between front upper and lower portions 16 and 18 is filled with an insulating material 38. Typically, insulating material 38 is photoresist. Gap 24 between upper pole tip 20 and lower pole tip 22 is filled with alumina, $Al_2O_3$. Insulating material 38 is also sandwiched between rear upper and lower portions 26 and 28 of core 14.

Also shown is FIG. 1 is conductive stud 40 extending through base coat 36 between base substrate 12 and via 30 of core 14. Conductive stud 40 is in electrical contact with core 14 through via 30 and base substrate 12. Through conductive stud 40, an electrical circuit is formed between core 14 and base substrate 12.

During fabrication, heads similar to thin film head 10 may be deposited across the entire surface of base substrate 12. After the layers of thin film head 10 are deposited as shown in FIG. 1, base substrate 12 upon which head 10 is formed is "diced" or sliced into many individual thin film heads, each carried by a portion of base substrate 12, such that upper and lower pole tips 20 and 22 and gap 24 are exposed. Gap 24 and pole tips 20 and 22 may then be lapped in a direction generally inward, toward the center of thin film head 10, to the desired dimensions. The lapping process is a grinding process in which the exposed portion of gap 24 is applied to a diamond slurry. Electrical contacts (not shown) are applied to conductors 32 and 34 of thin film head 10. The completed head may then be attached to some type of carrying fixture (not shown) for use in reading and writing data on a magnetic storage medium such as a computer disk.

In operation, the magnetic storage medium is placed near upper and lower pole tips 20 and 22 which form gap 24. During the read operation, the changing magnetic field due to the moving storage medium impresses a magnetic field upon upper and lower pole tips 20 and 22 formed by front upper and lower portions 16 and 18 of core 14. This impressed field is carried around conductors 32 and 34 through front upper portion 16, via 30 and front lower portion 18 of core 14. This causes an electrical current to be induced in conductors 32 and 34. This electric current is representative of the magnetic field produced by the moving magnetic storage medium. During the write operation, an electric current is caused to flow in conductor 32 or conductor 34. This results in a magnetic field in core 14 which is applied to the storage medium (not shown) due to the fringing effect at gap 24 formed between upper and lower pole tips 20 and 22 of core 14.

The dimensions of thin film head 10 are extremely small. At these small dimensions and at the high speed at which the thin film magnetic head reads and writes data, stray capacitance may have a significant effect in degrading head performance. Specifically, the capacitance due to the separation between magnetic core 14 of thin film head 10 and the surrounding structure, such as base substrate 12, may degrade head performance. Furthermore, the material of core 14 of thin film magnetic head 10 may act as a conduit for noise to enter conductors 32 and 34 of thin film magnetic head 10. The environment in which magnetic head 10 operates is typically filled with many noise sources including stepper motors, disk drive motors and high frequency electrical equipment. During the read operation, these noise sources could interfere with the information signals carried in the form of electrical currents in conductors 32 and 34 by masking the information being read from the storage medium.

These problems are alleviated, however, by conductive stud 40 which forms an electrical circuit between core 14 and base substrate 12 through base coat 36. Conductive stud 40 electrically shorts stray capacitance formed due to the separation between core 14 and base substrate 12.

The steps used in fabricating thin film magnetic head 10 of FIG. 1 are shown individually in FIGS. 2-9. In the cross sectional view of FIG. 2, base substrate 12 is shown. Base substrate 12 is typically large relative to the dimensions of the thin film magnetic heads and is referred to as a "wafer". During the manufacturing process, many thin film heads such as thin film head 10 typically are fabricated upon a single such base substrate 12. For this example, however, only the fabrication of single thin film magnetic head 10 is shown. Typically, base substrate 12 is made of an electrically conductive material, such as ALSIMAG.

Figure 3:
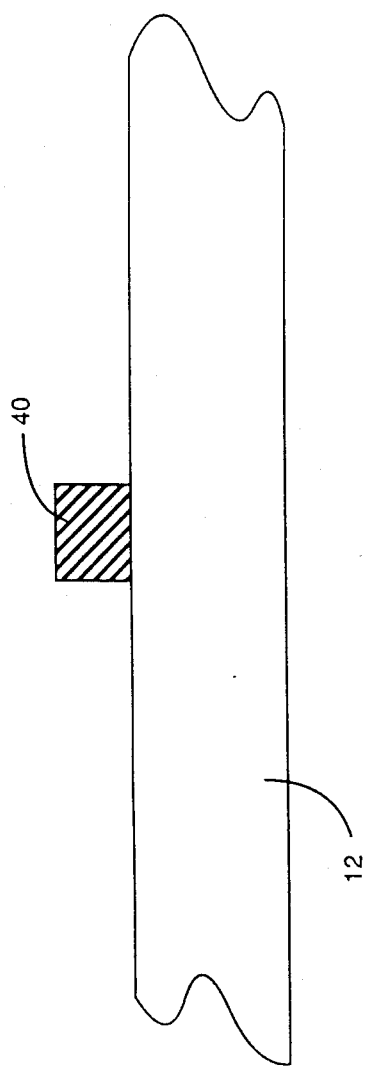
FIG. 3 is a cross sectional view of a portion of the substrate material, including a conductive stud.

In FIG. 3, base substrate 12 is shown following deposition of conductive stud 40. Conductive stud 40 may be deposited upon base substrate 12 using photolithographic masks. Using photolithographic masks, photoresist is applied across substrate 12 except for the portion where stud 40 is to be formed. In the area where conductive stud 40 is to be formed, the photoresist is in the form of a reverse image, or mold of stud 40. The material used to form conductive stud 40 is then deposited into this photoresist mold. The photoresist is then chemically removed leaving only the structure shown in FIG. 3. Using this technique, conductive stud 40 has a generally cylindrical shape. Conductive stud 40 is in electrical contact with base substrate 12. Copper is a suitable material for forming conductive stud 40, although other electrically conductive materials may also be used.

Figure 4:
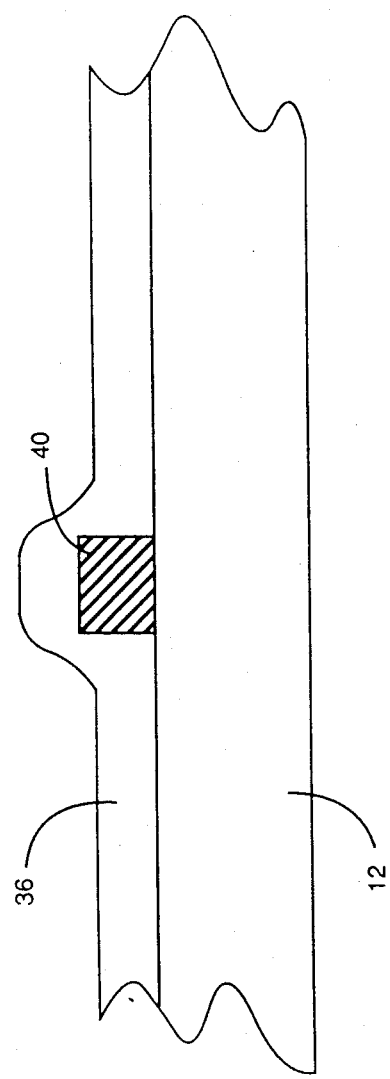
FIG. 4 is a cross sectional view of the substrate including a base coat.

Following the deposition of conductive stud 40 upon base substrate 12, a base coat layer 36 is deposited across the entire base substrate 12 as shown in FIG. 4. Base coat 36 is a nonconductive material, typically comprising $Al_2O_3$. Base coat 36 may be applied using sputtering techniques. This results in the rise in base coat 36 due to conductive stud 40 shown in FIG. 4. This rising portion may be removed by "lapping" the face of base coat layer 36. After lapping base coat layer 36, the cross sectional view resembles that shown in FIG. 5.

The lapping process removes a portion of base coat layer 36 until the face of conductive stud 40 is exposed. Typically a diamond slurry is used in the lapping process. Lapping may be done over a timed period to ensure enough base coat layer 36 is removed from conductive stud 40 to expose the face of conductive stud 40. Alternatively, base coat layer 36 may be visually inspected to determine if the face of conductive stud 40 is exposed. A third method of determining whether enough base coat layer 36 has been removed to expose the face of conductive stud 40 is by detecting the resistance between base substrate 12 and the diamond slurry used in the lapping processing. When the face of conductive stud 40 is exposed to the diamond slurry, the resistance measured between base substrate 12 and the diamond slurry will drop significantly. Typically, during the lapping processing a small portion of conductive stud 40 may be removed along with base coat 36. This is not harmful to the completed thin film magnetic read/write head 10 shown in FIG. 1.

Figure 5:
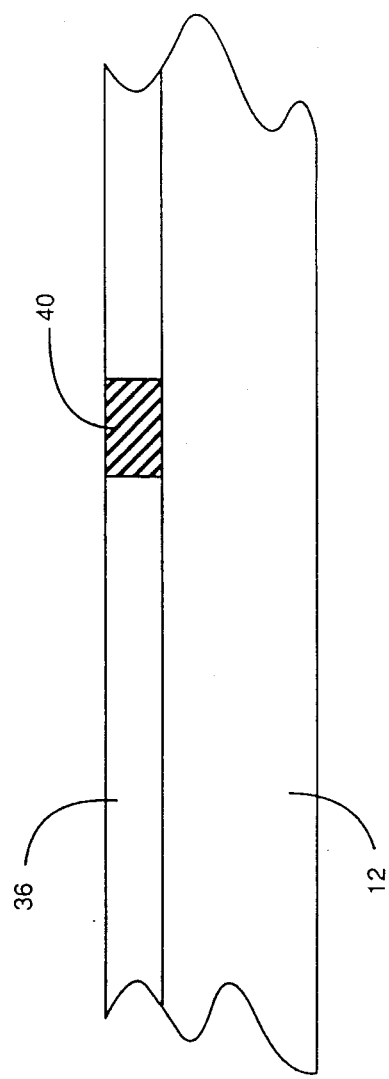
FIG. 5 is a cross sectional view of the substrate following a lapping process.
Figure 6:
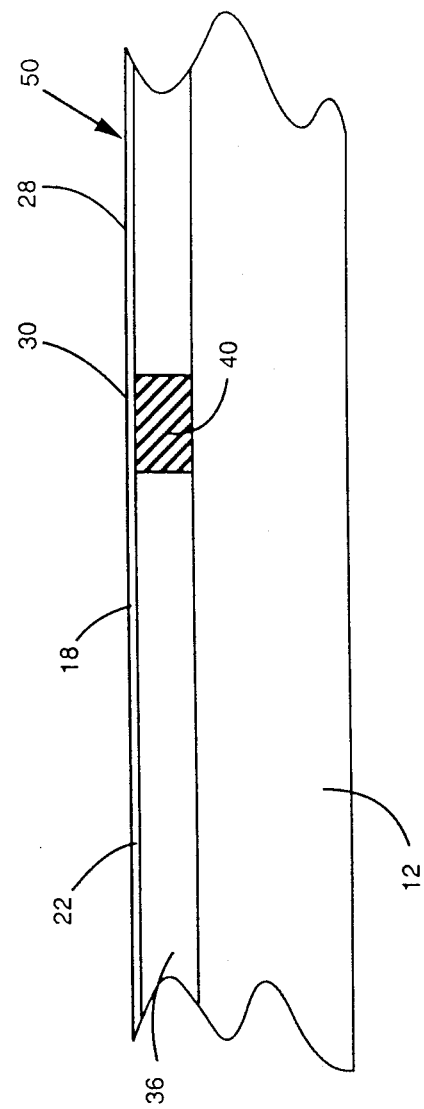
FIG. 6 is a cross sectional view of the substrate following deposition of a portion of the magnetic core material.

After base coat 36 has been lapped to the extent shown in FIG. 5, and the face of conductive stud 40 is exposed, thin film layer 50 of magnetic material such as Permalloy is applied across the surface. This layer 50 forms lower front portion 18 and lower rear portion 28 of core 14, as well as lower pole tip 22 and part of via 30.

Figure 7:
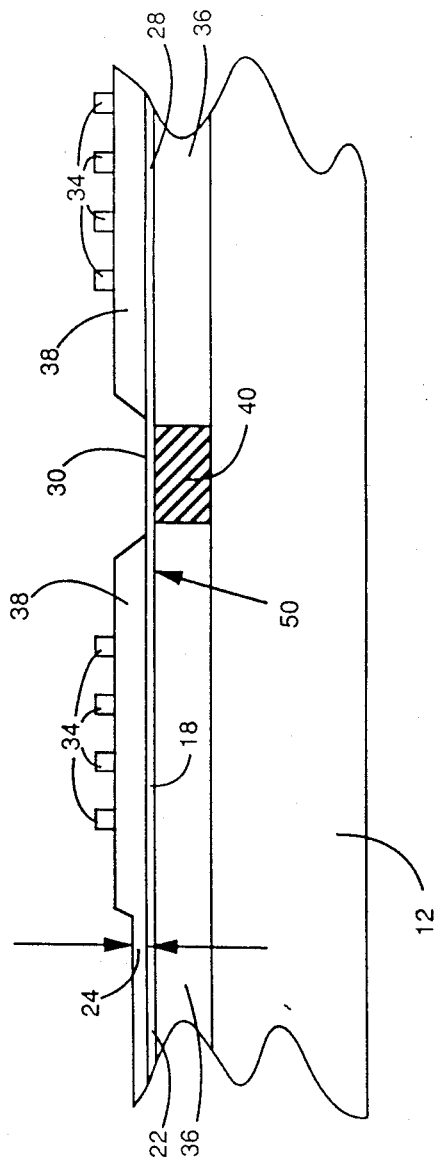
FIGS. 7 and 8 are a cross sectional views of the substrate following deposition of electric conductors.

Next, using photolithographic techniques, insulating layer 38 is deposited upon layer 50 of core 14 in the shape shown in FIG. 7. $Al_2O_3$ is deposited in gap 24. Conductors 34 are deposited upon insulating layer 38 and formed in a coiled shape.

Figure 8:
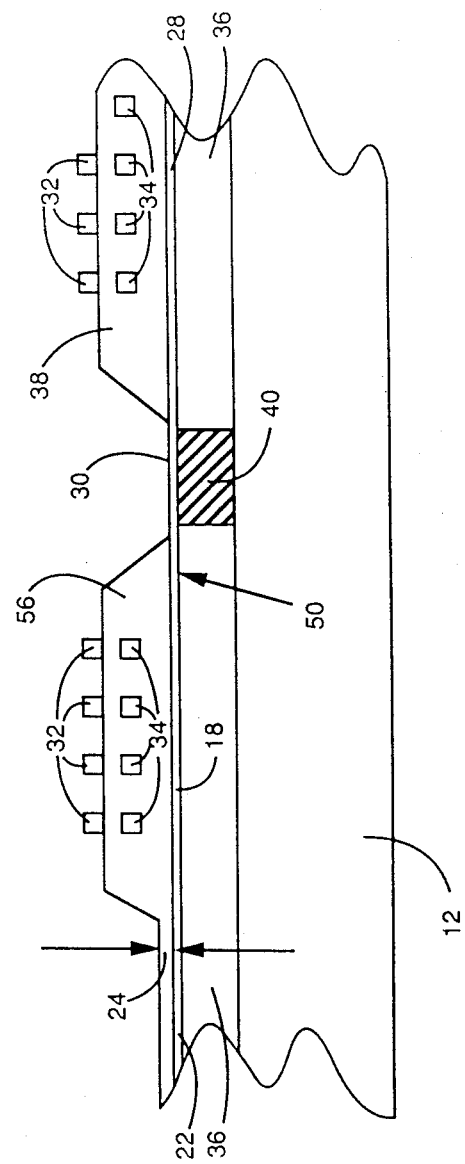

In FIG. 8, insulating layer 38 has been built up slightly using photolithographic masking and etching techniques. Conductors 32 are deposited similar to conductors 34, and formed in a coiled shape.

Figure 9:
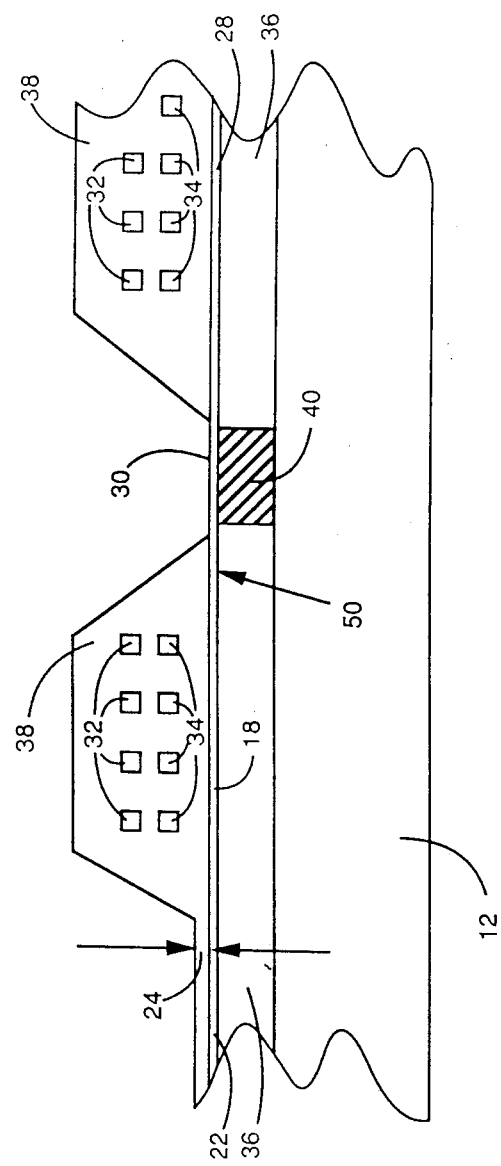
FIG. 9 is a cross sectional view of the substrate following deposition of insulation layers.

In FIG. 9, insulating layer 38 has been built up and covers conductors 32 and 34. Next, another layer of magnetic material is deposited over the structure shown in FIG. 9 to form front upper portion 16, rear upper portion 26, and a part of via 54 as shown in FIG. 1.

Core 14 is electrically in contact with base substrate 12 through conductive stud 40 in base coat layer 36. Stray capacitance due to the separation between core 14 and base substrate 12 is shorted out by conductive stud 40 which is connected electrically in parallel with this stray capacitance. In addition, conductive stud 40 electrically grounds core 14, which is an advantage because grounded thin film magnetic head 10 is less sensitive to noise signals present in its operating environment. Conductive stud 40 may be sandwiched between core 14 and base substrate 12 at positions other than those shown in the Figures, but its location near via 30 is preferred.

Although the present invention is described with reference to preferred embodiments, workers skilled in the art will recognize that changes may be made in form and detail without departing from the spirit and scope of the invention.

What is claimed is:

1. A thin film magnetic read/write head comprising:
   a substrate;
   a thin film magnetic core supported by the substrate including a read/write gap for reading and writing information;
   means for separating the substrate and the magnetic core;
   a coil within the magnetic core and extending therethrough; and
   conductive stud means formed separately from and extending between the substrate and the magnetic core for electrically connecting the substrate to the magnetic core.

2. The thin film magnetic read/write head of claim 1 wherein the means for separating the substrate and the magnetic core comprises a separating layer sandwiched between the substrate and the magnetic core.

3. The thin film magnetic read/write head of claim 2 wherein the substrate, the magnetic core and the conductive stud means have greater electrical conductivity than the separating layer.

4. The thin film magnetic read/write head of claim 2 wherein the thin film magnetic core comprises:
   a first magnetic layer deposited upon the separating layer; and
   a second magnetic layer deposited upon the first magnetic layer; wherein first and second magnetic layers have a first region at which first and second magnetic layers are electrically connected at a via, a second region at which first and second magnetic layers are separated and in which the coil is positioned, and a third region at which first and second magnetic layers are separated and form the read/write gap.

5. The thin film magnetic read/write head of claim 4 wherein the second region is filled with an insulating means for electrically insulating the first magnetic layer from the second magnetic layer.

6. The thin film magnetic read/write head of claim 5 wherein the third region is filled with alumina.

7. The thin film magnetic read/write head of claim 4 wherein the conductive stud means contacts the thin film magnetic core at the via.

8. The thin film magnetic read/write head of claim 1 wherein the conductive stud means is a copper stud.

9. The thin film magnetic read/write head of claim 1 wherein the magnetic core is an iron alloy.

* * * * *

UNITED STATES PATENT AND TRADEMARK OFFICE
CERTIFICATE OF CORRECTION

PATENT NO. : 4,972,286
DATED : November 20, 1990
INVENTOR(S) : Mark Jursich et al.

It is certified that error appears in the above-identified patent and that said Letters Patent is hereby corrected as shown below:

Title page: Item [54]  delete "MGANETIC", insert --MAGNETIC--.

Item [19&75] Inventors: delete Mark Jurisch, insert --Mark Jursich--.

Signed and Sealed this

First Day of June, 1993

Attest:

MICHAEL K. KIRK

Attesting Officer

Acting Commissioner of Patents and Trademarks